(12) United States Patent
Jeong

(10) Patent No.: US 11,826,931 B2
(45) Date of Patent: Nov. 28, 2023

(54) METHOD OF MANUFACTURING MULTI-HARDNESS AND MULTI-ELASTICITY FOAM MATTRESS BY USE OF CONTINUOUS FOAMING PROCESS AND FOAM MATTRESS MANUFACTURED THEREBY

(71) Applicant: DUT KOREA CO., LTD, Busan (KR)

(72) Inventor: Yong Chai Jeong, Busan (KR)

(73) Assignee: DUT KOREA CO., LTD., Busan (KR)

( * ) Notice: Subject to any disclaimer, the term of this patent is extended or adjusted under 35 U.S.C. 154(b) by 291 days.

(21) Appl. No.: 16/073,582

(22) PCT Filed: Apr. 24, 2018

(86) PCT No.: PCT/KR2018/004756
§ 371 (c)(1),
(2) Date: Jul. 27, 2018

(87) PCT Pub. No.: WO2019/050124
PCT Pub. Date: Mar. 14, 2019

(65) Prior Publication Data
US 2021/0206035 A1    Jul. 8, 2021

(30) Foreign Application Priority Data
Sep. 8, 2017    (KR) .................... 10-2017-0115426

(51) Int. Cl.
| | |
|---|---|
| B29C 44/22 | (2006.01) |
| A47C 27/14 | (2006.01) |
| B29C 44/46 | (2006.01) |
| B29C 44/56 | (2006.01) |
| B68G 7/00 | (2006.01) |
| B29K 75/00 | (2006.01) |
| B29K 105/04 | (2006.01) |
| B29L 31/00 | (2006.01) |

(52) U.S. Cl.
CPC ............ B29C 44/22 (2013.01); A47C 27/148 (2013.01); B29C 44/467 (2013.01); B29C 44/5627 (2013.01); B29C 44/5681 (2013.01); *B68G 7/00* (2013.01); *B29K 2075/00* (2013.01); *B29K 2105/04* (2013.01); *B29L 2031/751* (2013.01)

(58) Field of Classification Search
CPC ... B29C 44/22; B29C 44/467; B29C 44/5627; B29C 44/5681; B29C 44/468;
(Continued)

(56) References Cited

U.S. PATENT DOCUMENTS 6,399,189 B1 * 6/2002 Kobayashi ............ B29C 44/00
428/178
2005/0194401 A1 * 9/2005 Khoshnevis .......... B29C 64/118
222/100

(Continued)

FOREIGN PATENT DOCUMENTS

| JP | 2005-137596 A | 6/2005 |
|---|---|---|
| JP | 2005-169699 A | 6/2005 |

(Continued)

*Primary Examiner* — Justin C Mikowski
*Assistant Examiner* — Luke Hall

(57) ABSTRACT

A method of manufacturing a multi-hardness and multi-elasticity foam mattress in which a plurality of foam blocks are formed integrally with each other by use of a continuous foaming process the method comprising the steps of: arranging a plurality of nozzles above one end of a molding plate; installing a separation wall between two adjacent ones of the respective nozzles arranged at the molding plate; laminating a release paper on the top of the molding plate; spraying foaming solutions from the nozzles, respectively, wherein the release paper moves in a direction toward the other end of the molding plate corresponding to a moving speed of the foaming solution; and molding a foam body having a plurality of zones where a plurality of unit foam blocks have multi-hardnesses and multi-elasticities.

2 Claims, 7 Drawing Sheets

(58) Field of Classification Search
CPC .... A47C 27/148; B68G 7/00; B29K 2075/00; B29K 2105/04; B29L 2031/751; B29D 99/0092
USPC .......................................................... 5/727
See application file for complete search history.

(56) References Cited

U.S. PATENT DOCUMENTS

| | | | | |
|---|---|---|---|---|
| 2010/0092767 A1* | 4/2010 | Naito | ........................ | B32B 9/04 |
| | | | | 156/322 |
| 2016/0039987 A1* | 2/2016 | Miki | ........................ | B32B 5/16 |
| | | | | 428/317.9 |
| 2016/0121577 A1* | 5/2016 | Waggoner | ............... | C08J 9/0061 |
| | | | | 428/314.2 |
| 2016/0279846 A1* | 9/2016 | Kong | .................. | B29C 44/0407 |
| 2018/0056582 A1* | 3/2018 | Matusik | ................ | B29C 64/393 |
| 2018/0281358 A1* | 10/2018 | Ben-Daat | ................ | B29C 48/21 |

FOREIGN PATENT DOCUMENTS

| | | | | | |
|---|---|---|---|---|---|
| JP | 2008-254394 | A | | 10/2008 | |
| KR | 10-2007-0026934 | A | | 3/2007 | |
| KR | 10-2011-0101958 | A | | 9/2011 | |
| KR | 20110101958 | A | * | 9/2011 | ............. A47C 27/14 |
| KR | 101199453 | B1 | * | 6/2012 | ............. A61L 15/22 |
| KR | 10-1199453 | B1 | | 11/2012 | |
| WO | 2017-122860 | A1 | | 7/2017 | |

* cited by examiner

[Fig. 1]
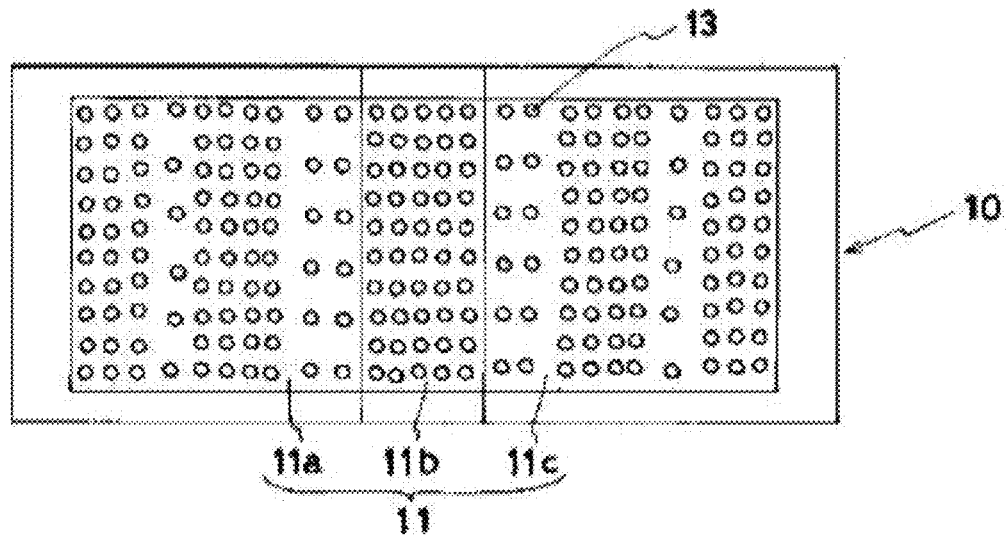
[Fig. 2]
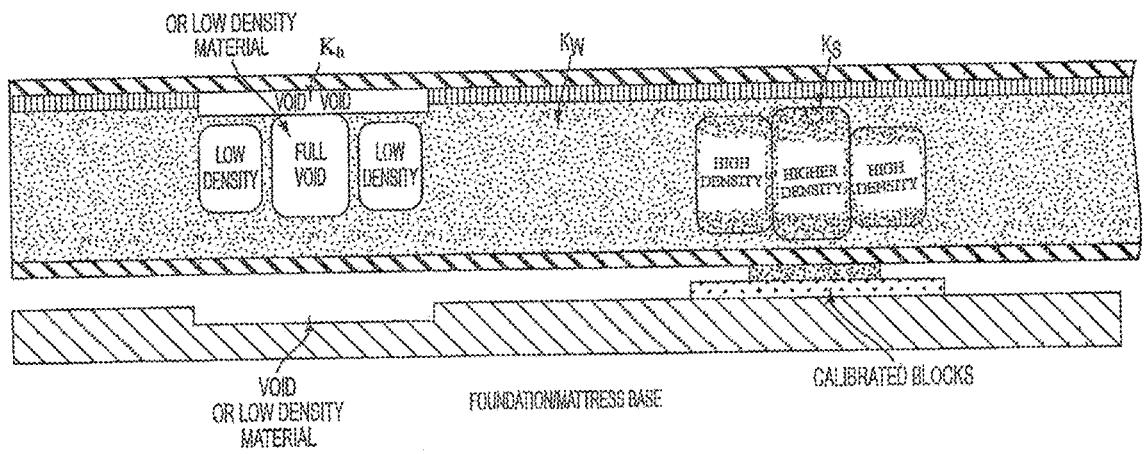
[Fig. 3]
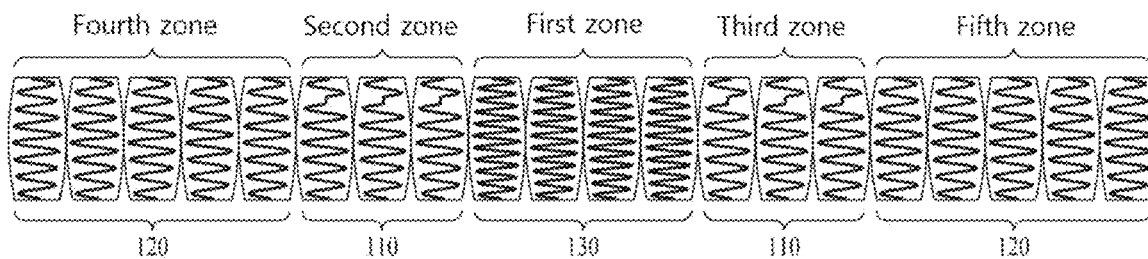

[Fig. 4]
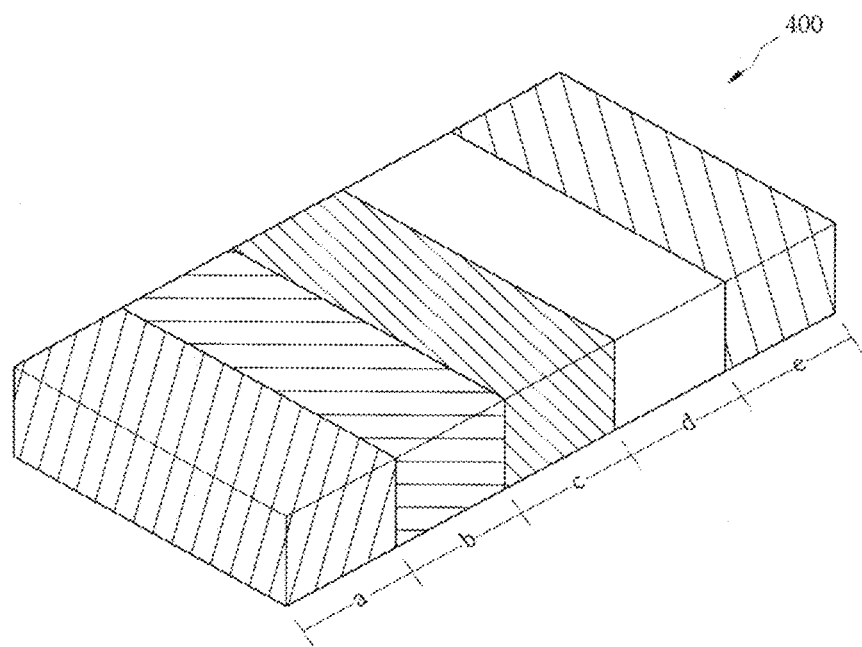

[Fig. 5]
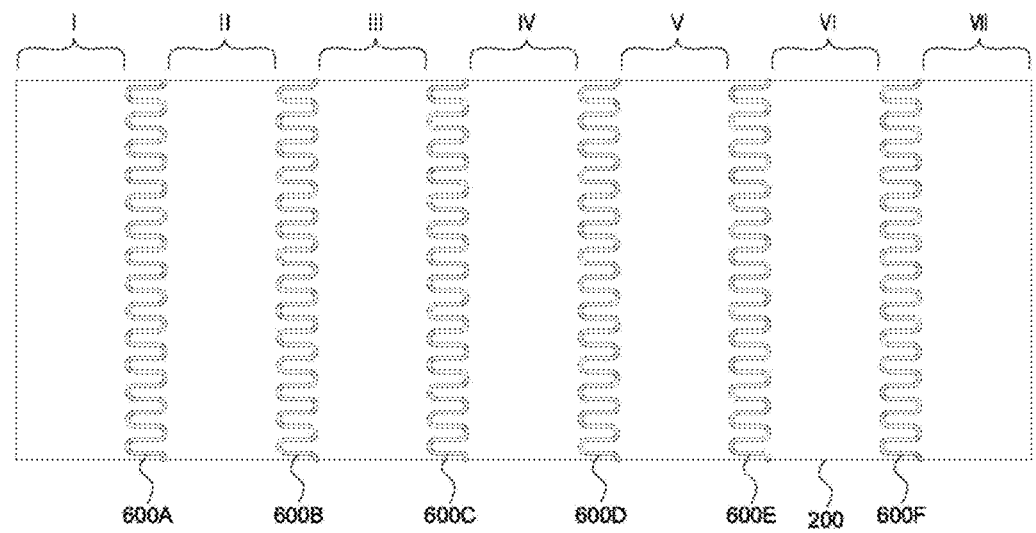
(a)
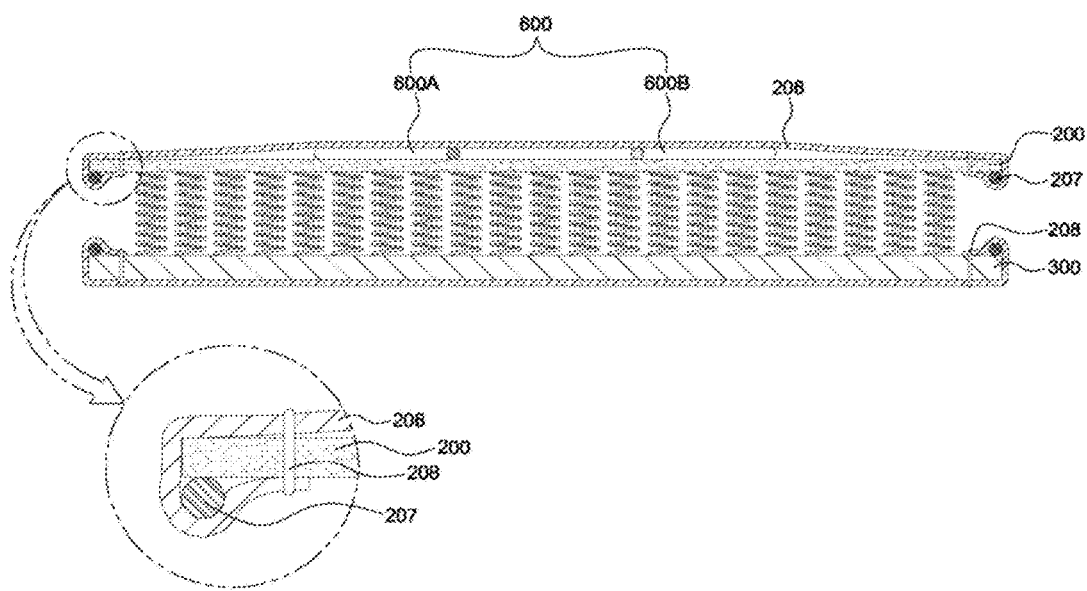
(b)

[Fig. 6]
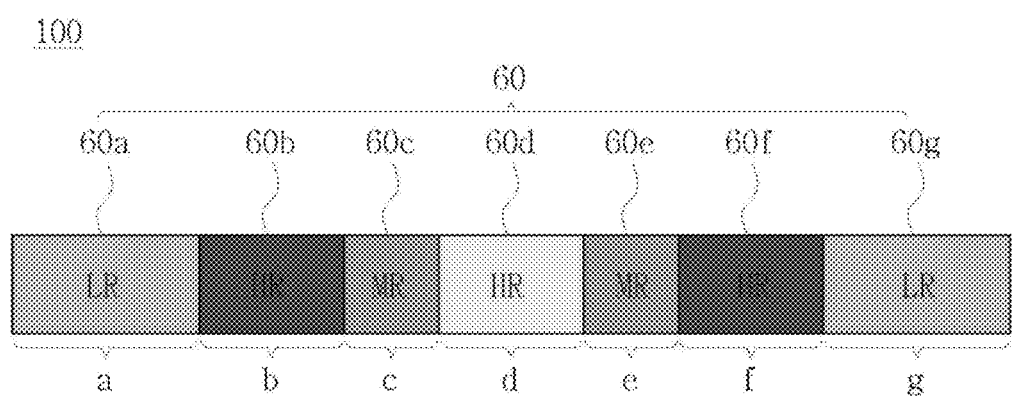

[Fig. 7]
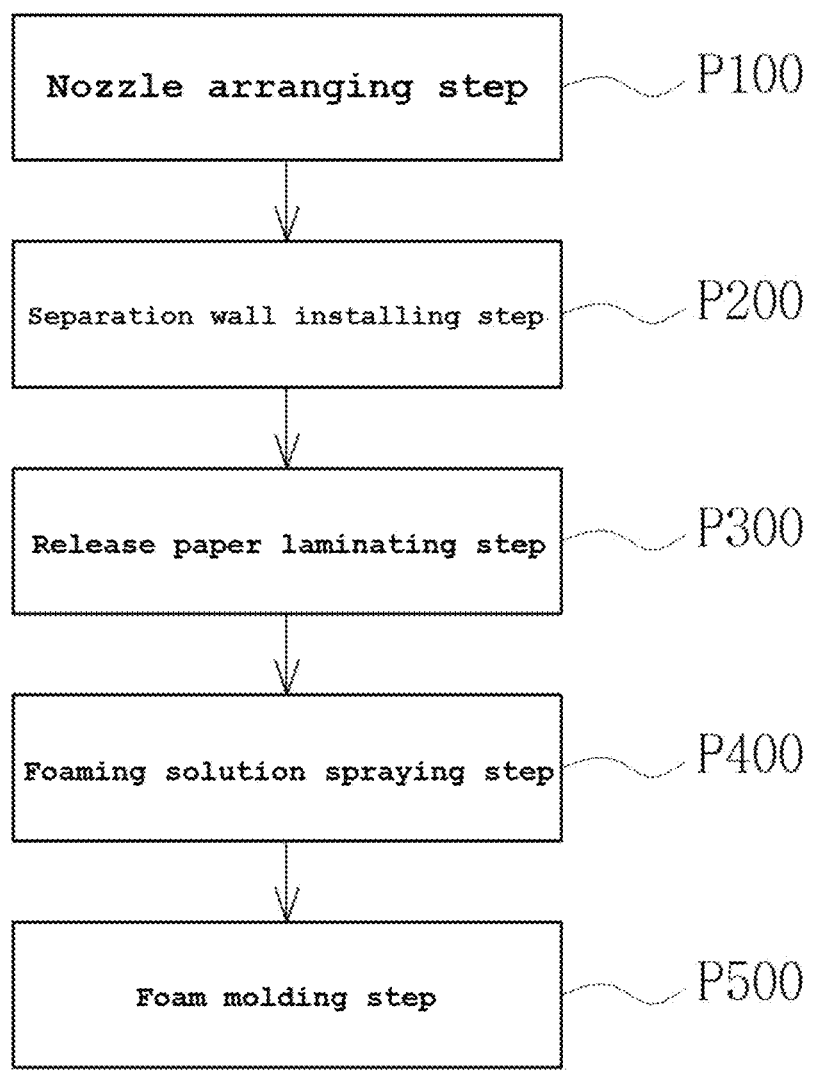

[Fig. 8]
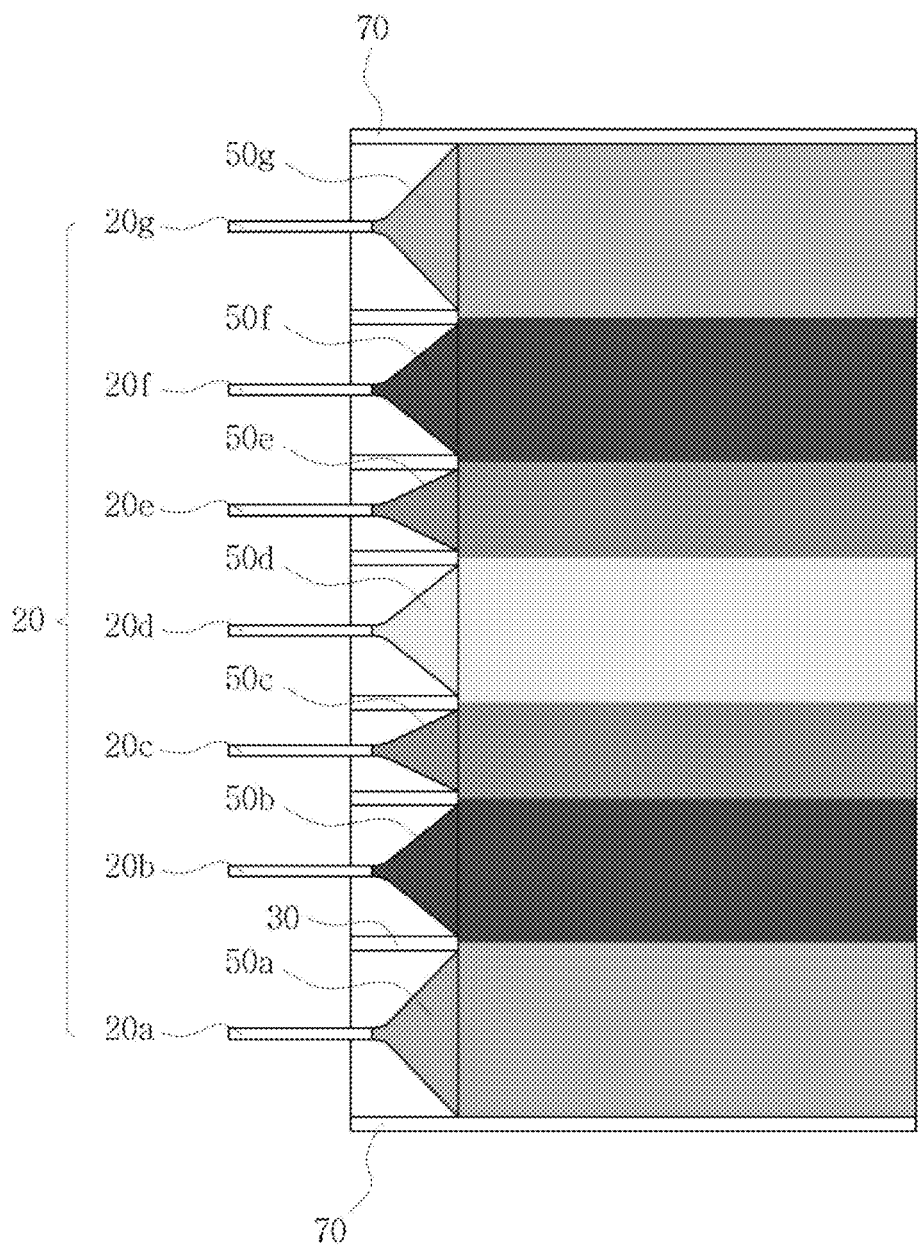

[Fig. 9]
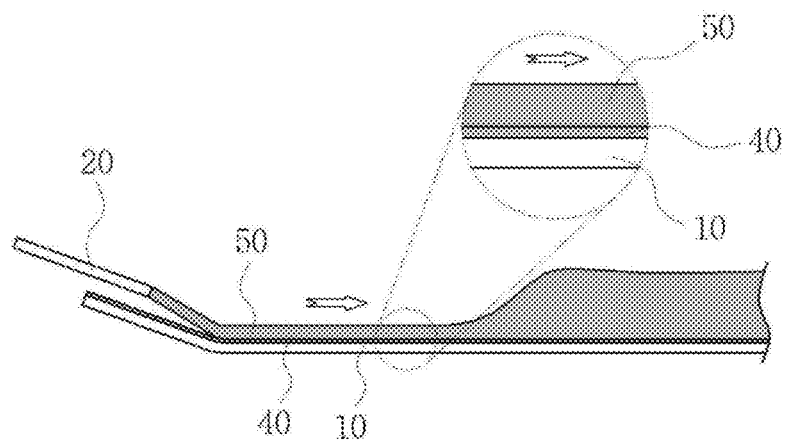

METHOD OF MANUFACTURING MULTI-HARDNESS AND MULTI-ELASTICITY FOAM MATTRESS BY USE OF CONTINUOUS FOAMING PROCESS AND FOAM MATTRESS MANUFACTURED THEREBY

TECHNICAL FIELD

The present invention relates to a method of manufacturing a multi-hardness and multi-elasticity foam mattress by use of a continuous foaming process and a foam mattress manufactured thereby, in which a plurality of unit foam blocks made of polyurethane foams having multi-hardnesses and multi-elasticities different from each other are formed integrally with each other along the longitudinal direction of the foam mattress by the continuous foaming process to thereby mold a foam mattress, so that the foam mattress manufacturing method is simplified to increase the productivity of the foam mattress, and the durability of the foam mattress is excellent as well as the optimum body pressure distribution and somatotype maintenance effects can be implemented, and in which a pair of associated unit foam blocks of a pair of zones positioned symmetrically opposed to each other, based on a unit foam block positioned at the central portion of the mattress in the longitudinal direction of the foam mattress, have the same hardness and elasticity as each other, so that the position of the mattress can be inversely changed during the use of the mattress.

BACKGROUND ART

In recent years, cervical and spinal diseases are sharply increasing irrespective of age or sex due to a drastic change in lifestyle of modern humans such as a change in a means of transportation, self-driving cars, using computers, viewing TV, competitive studying or simple repeated work, and the like. In particular, the spine is composed of a flexible vertebral column with an S-shape, which is a key body tissue that is located at the center of the human body to support the body weight and functions to protect a spinal cord as the central nerve, lumbar vertebrae that support the waist, intervertebral discs interposed between vertebrae to interconnect the vertebrae, and ligaments that surround these body parts.

Meanwhile, for the purpose of the preventive maintenance of such cervical and spinal diseases, the following items are recommended: a preparatory warm-up exercise, a steady exercise helpful in maintaining a good posture and strengthening waist muscles, a rest, stretching, and the like. As an alternative, the selection of bedding that aids in maintaining a right posture during sleeping is emerging. Sleeping is an act of maintaining the same posture for the longest time of the day. First of all, the most important challenge is to develop a mattress that can release the waist muscles and ligaments stiffened during the day, relax the pressed bones, and correct the skeletal morphology properly. Accordingly, the development of a mattress which makes different the hardness and elasticity for each region of the mattress is actively in progress in consideration of the somatotype characteristics for each parts of the human body. When the hardness and elasticity for each region of the mattress are set different from each other in response to the somatotype for each parts of the human body, an optimum electromyography value can be maintained by ideally supporting the lumbar and thoracic curves. In addition, a deep sleep can be taken and the cause of the occurrence of musculoskeletal disorders resulting from the wrong posture can be addressed and corrected naturally during sleeping by elastically supporting hips or buttocks through pressing, inducing heel portions to sink into a mattress foam, and leading the body pressure distribution and the somatotype maintenance of the thigh and leg portions. Further, the optimum body pressure distribution can release the waist muscles and ligaments stiffened during the day, and relax the bones pressed due to the activity during the day to restore the flexibility of muscles.

As a prior art technology to implement the above-mentioned effects, at the initial stage of the development of a mattress which differently sets the hardness and elasticity for each region of the mattress, there has been proposed Japanese Patent Laid-Open Publication No. Hei 8-228891 (laid-open on Sep. 10, 1996) disclosing a three-zone urethane mattress, which includes three unit blocks, i.e., a buttock cushion body 11b having a plurality of through-holes 13 formed most densely therein, and upper and lower cushion bodies 11a and 11c whose through-holes are formed less densely than those of the buttock cushion body 11b as shown in FIG. 1.

In addition, recently, a five-zone mattress including five unit blocks is being developed. U.S. Patent Publication No. 2012-0260420 (laid-open on Oct. 18, 2012) discloses a bedding apparatus and an improved method of forming a bed. As shown in FIG. 2, the U.S. document teaches an invention relating to a bed mattress characterized in that insertable structures having compression factors predetermined to provide a resiliency to each of three areas of the mattress are inserted into the mattress. Korean Patent No. 10-1707713 (registered on Jun. 10, 2017) discloses a five-zone mattress comprising a plurality of kinds of pocket springs which have different elastic deformation degrees. As shown in FIG. 3, a plurality of kinds of pocket springs having different elastic deformation degrees are built in each unit block of the mattress. Korean Patent No. 10-1205824 (registered on Nov. 22, 2012) as patent document 4 discloses a method of manufacturing a multi-hardness and multi-elasticity mattress having a five-zone structure, and is a patent that was developed by the present inventor and granted a registration. A first block, a second block and a third block, which have different hardnesses and elasticities, are disposed in a foaming mold in such a manner that the first and second blocks and the second and third blocks are arranged spaced apart from each other at regular intervals and a foaming solution is injected between the spacings of the first and second blocks and the second and third blocks so that a fourth block and a fifth block are formed integrally at the spaces defined between the first to third blocks.

However, the above-mentioned Japanese Patent Laid-Open Publication No. Hei 8-228891 (laid-open on Sep. 10, 1996) is directed to a three-zone mattress that includes three unit blocks arranged in the longitudinal direction of the mattress in consideration of only an upper body and a lower body of a human centering on a buttock region, U.S. Patent Publication No. 2012-0260420 (laid-open on Oct. 18, 2012) is directed to a bedding apparatus and an improved method of forming a bed, Korean Patent No. 10-1707713 (registered on Jun. 10, 2017) is directed to a five-zone mattress comprising a plurality of kinds of pocket springs having different elastic deformation degrees, and Korean Patent No. 10-1205824 (registered on Nov. 22, 2012) is directed to a method of manufacturing the multi-hardness and multi-elasticity mattress. The mattress manufactured by the method disclosed in the Korea Patent No. 10-1205824 document is a five-zone mattress consisting of five unit blocks, and entails problems in that each load according to the head, the neck, the shoulders, the waist, the hips, the thigh, and the legs of the human body is not taken into consideration, leading to creation of a structure designed inappropriately in terms of the ergonomic aspect, and in that the position of the mattress cannot be inversely changed during the use of the mattress due to a difference in elasticity according to each unit block.

Therefore, in an attempt to solve the above-mentioned problems, in recent years, a seven-zone mattress consisting of seven unit blocks is prevalently used as a mattress designed in consideration of each load according to the head, the neck, the shoulders, the waist, the hips, the thigh, and the legs of the human body. The mattress as structured above is disclosed in Korean Patent No. 10-1734028 (registered on May 1, 2017). As shown in FIG. 5, springs having different elastic deformation degrees are built in the seven-zone mattress. Such a mattress encounters a problem in that it employs a plurality of spring members, resulting in a complexity of its structure and manufacturing method as well as an increase in the manufacturing cost and selling price due to the use of expensive spring members.

DISCLOSURE OF INVENTION

Technical Problem

Accordingly, the present invention has been made in order to solve the above-described problems occurring in the prior art, and it is an object of the present invention is to provide a method of manufacturing a multi-hardness and multi-elasticity foam mattress by use of a continuous foaming process and a foam mattress manufactured thereby, in which a plurality of unit foam blocks made of polyurethane foams having multi-hardnesses and multi-elasticities different from each other are formed integrally with each other along the longitudinal direction of the foam mattress by the continuous foaming process to thereby mold a foam mattress, so that the foam mattress manufacturing method is simplified to increase the productivity of the foam mattress, and the durability of the foam mattress is excellent as well as the optimum body pressure distribution and somatotype maintenance effects can be implemented.

Another object of the present invention is to provide a method of manufacturing a multi-hardness and multi-elasticity foam mattress by use of a continuous foaming process and a foam mattress manufactured thereby, in which the number of unit foam blocks is preferably 5 to 9, and a pair of associated unit foam blocks of a pair of zones positioned symmetrically opposed to each other, based on a unit foam block positioned at the central portion of the mattress in the longitudinal direction of the foam mattress, have the same hardness and elasticity as each other, so that the position of the foam mattress can be inversely changed during the use of the foam mattress.

Technical Solution

To achieve the above objects, in one aspect, the present invention provides a method of manufacturing a multi-hardness and multi-elasticity foam mattress in which a plurality of unit foam blocks are formed integrally with each other by use of a continuous foaming process, the method comprising the steps of: arranging a plurality of nozzles 20 at one end of a molding plate 10; installing a separation wall 30 between two adjacent ones of the respective nozzles 20 arranged at the molding plate 10; laminating a release paper 40 on the top of the molding plate 10; spraying a foaming solution 50 from each of the nozzles 10 in such a manner as to allow the release paper 40 to move in a direction toward the other end of the molding plate 10 to correspond to the moving speed of the foaming solution 50; and molding a foam so as to integrally form a plurality of zones where a plurality of unit foam blocks 60 have multi-hardnesses and multi-elasticities different from each other.

To achieve the above objects, in another aspect, the present invention provides a multi-hardness and multi-elasticity foam mattress manufactured by the method, in which the plurality of unit foam blocks 60 are formed integrally with each other by the continuous foaming process.

Further, in the present invention, each of the plurality of unit foam blocks (60) may be made of a polyurethane foam, and the number of the plurality of unit foam blocks 60 maybe 5 to 9. In addition, the foam mattress 100 may be configured such that among the plurality of unit foam blocks having different hardnesses and elasticities, which are arranged at the left and right sides along the longitudinal direction of the foam mattress 100 based on a zone of a unit foam block 60 positioned at the central portion of the mattress in the longitudinal direction of the foam mattress, a pair of associated unit foam blocks 60 of a pair of zones positioned symmetrically opposed to each other have the same hardness and elasticity as each other.

Advantageous Effects

The present invention has effects in that a plurality of unit foam blocks made of polyurethane foams having multi-hardnesses and multi-elasticities different from each other are formed integrally with each other along the longitudinal direction of the foam mattress by the continuous foaming process to thereby mold a foam mattress, so that the foam mattress manufacturing method is simplified to increase the productivity of the foam mattress, and the durability of the foam mattress is excellent as well as the optimum body pressure distribution and somatotype maintenance effects can be implemented, resulting in a reduction in the electromyography value and an improvement of the blood stream, and also resulting in being helpful in the deep sleep maintenance, the security of the flexibility of muscles, and the maintenance of the ideal skeletal morphology, and in that a pair of associated unit foam blocks of a pair of zones positioned symmetrically opposed to each other, based on a unit foam block positioned at the central portion of the mattress in the longitudinal direction of the foam mattress, have the same hardness and elasticity as each other, so that the position of the foam mattress can be inversely changed during the use of the foam mattress.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1 is a view showing a three-zone urethane mattress including three unit blocks according to the prior art;

FIGS. 2 and 3 are side cross-sectional views showing a five-zone mattress including five unit blocks according to the prior art;

FIG. 4 is a top perspective view showing a five-zone multi-hardness and multi-elasticity mattress including five unit blocks according to the prior art;

FIG. 5 is a longitudinal cross-sectional view showing a seven-zone mattress including seven unit blocks according to the prior art;

FIG. 6 is a side cross-sectional view schematically showing a multi-hardness and multi-elasticity foam mattress manufactured by a continuous foaming process according to an embodiment of the present invention;

FIG. 7 is a block diagram showing a process of manufacturing a multi-hardness and multi-elasticity foam mattress by use of a continuous foaming process according to an embodiment of the present invention;

FIG. 8 is a diagrammatic view showing a process of manufacturing a multi-hardness and multi-elasticity foam mattress by use of a continuous foaming process according to an embodiment of the present invention; and FIG. 9 is a side view showing a process of manufacturing a multi-hardness and multi-elasticity foam mattress by use of a continuous foaming process according to an embodiment of the present invention.

BEST MODE FOR CARRYING OUT THE INVENTION

Hereinafter, a method of manufacturing a multi-hardness and multi-elasticity foam mattress by use of a continuous foaming process and a foam mattress manufactured thereby according to a preferred embodiment of the present invention will be described in further detail with reference to the accompanying drawings.

A shield wall 70 can be respectively installed at right and left distal ends along a direction where a foaming solution 50 injected from a nozzle 20 flows so as to prevent the foaming solution 50 from flowing externally from a molding plate 10.

A release paper laminating step (P300) is a step of laminating a release paper 40 on the top of the molding plate 10. The release paper acts to allow foaming solutions sprayed from each of nozzle 20*a* to 20*g* to flow smoothly while preventing the foaming solutions from being mixed with each other, thereby forming unit foam blocks having different multi-hardnesses and multi-elasticities.

A foaming solution spraying step (P400) is a step of spraying a foaming solution 50 from each of the nozzles 10 in such a manner as to allow the release paper 40 to move in a direction toward the other end of the molding plate 10 to correspond to the moving speed of the foaming solution 50, so that unit the foam blocks having different multi-hardnesses and multi-elasticities are formed in respective different zones.

As shown in FIGS. 8 and 9, the release paper 40 moves in a direction toward the other end of the molding plate 10 to correspond to the moving speed of the foaming solution 50 sprayed from the nozzles 10 from the positions of the molding plate 10 where the nozzles are arranged by a winding means (not shown) mounted at the other end of the molding plate 10 so that the foaming solutions 50 sprayed from the nozzles 10 can be smoothly laminated on the release paper 40.

In this case, as shown in FIG. 6, the foaming solutions are injected into and sprayed from each of the plurality of nozzles 20*a* to 20*g* such that elasticities and hardnesses of a unit foam block 60*c* and a unit foam block 60*e* respectively disposed opposed to each other at "c" and "e" zones can be made equal to each other, based on a unit foam block 60*d* disposed at a "d" zone of a foam mattress 100, elasticities and hardnesses of a unit foam block 60*b* and a unit foam block 60*f* respectively disposed opposed to each other at "b" and "f" zones can be made equal to each other, and elasticities and hardnesses of a unit foam block 60*a* and a unit foam block 60*g* respectively disposed opposed to each other at "a" and "g" zones can be made equal to each other, thereby forming unit foam blocks having different multi-hardnesses and multi-elasticities in the respective nozzles 20*a* to 20*g*.

A foam molding step (P500) is a step of molding a foam so as to integrally form a plurality of zones where a plurality of unit foam blocks 60 have multi-hardnesses and multi-elasticities different from each other. In the foam molding step, when the foaming solution is allowed to stand for 3 to 20 minutes at room temperature according to the kind of the foaming solution, a foam is molded in the form of a foam mattress 100, and the multi-hardness and multi-elasticity foam mattress 100 is manufactured in which a plurality of unit foam blocks 60*a* to 60*g* having multi-hardnesses and multi-elasticities different from each other for the respective "a" to "g" zones are molded integrally with each other.

In this case, preferably, each of the plurality of unit foam blocks 60 is made of a polyurethane foam, and the number of the plurality of unit foam blocks 60 is 5 to 9. The number of the zones constituting the unit foam blocks is necessarily not limited to the number of the zones as specified above.

If the foam molding time is less than the lower limit of the above specified time range, the foam mattress may not be molded sufficiently, and contrarily, if the foam molding time exceeds the upper limit of the above specified time range, the productivity of the foam mattress may be lowered.

In particular, the multi-hardness and multi-elasticity foam mattress 100 manufactured by the method according to the present invention is configured such that among the plurality of unit foam blocks having different hardnesses and elasticities, which are arranged at the left and right sides along the longitudinal direction of the foam mattress 100 based on a zone of a unit foam block 60 positioned at the central portion of the mattress in the longitudinal direction of the foam mattress, a pair of associated unit foam blocks of a pair of zones positioned symmetrically opposed to each other have the same hardness and elasticity as each other.

Accordingly, the multi-hardness and multi-elasticity foam mattress 100 according to the present invention is manufactured by the continuous foaming process so that the foam mattress manufacturing method is simplified, leading to a decrease in the manufacturing cost and selling price, and an increase in stability and lifespan of the foam mattress.

For reference, the multi-hardness and multi-elasticity foam mattress 100 according to the present invention includes a plurality of unit foam blocks 60*a* to 60*g* having multi-hardnesses and multi-elasticities different from each other for the respective "a" to "g" zones. The unit foam block is manufactured by setting at least one hardness selected from among LR (Low Resilience foam), MR (Medium Resilience foam), and HR (High Resilience foam).

Based on the hardness range of an elastic body according to each rating in the foregoing, for example, the Shore F hardness, the hardness range can be classified into the following ratings: LR (Low Resilience foam) (15-25), MR (Medium Resilience foam) (35-50), and HR (High Resilience foam) (25-35). Further, based on the ball rebound elasticity, the elasticity range is preferably classified into the following ratings: LR (5-10%), MR (10-15%), and HR (50-70%). But in each rating category, the hardness range of the elasticity body is necessarily not limited to the above specified numerical values, and may be properly adjusted to meet the needs of manufacturers or the demands of end users.

The unit foam blocks are arranged properly in consideration of the body pressure distribution regions when a person lies down on a mattress in such a manner that a pair of associated ones (60*a* and 60*g*; 60*b* and 60*f*; 60*c* and 60*e*) of the unit foam blocks are positioned symmetrically opposed to each other so as to be spaced apart from each other.

The method of manufacturing a multi-hardness and multi-elasticity foam mattress by use of a continuous foaming process and the foam mattress manufactured thereby according to the embodiments of the present invention haves effects in that the foam mattress manufacturing method is simplified to increase the productivity of the foam mattress, and the durability of the foam mattress is excellent as well as the optimum body pressure distribution and somatotype maintenance effects can be implemented, resulting in a reduction in the electromyography value and an improvement of the blood stream, and also resulting in being helpful in the deep sleep maintenance, the security of the flexibility of muscles, and the maintenance of the ideal skeletal morphology, and in that particularly, the number of unit foam blocks is preferably 5 to 9, and a pair of associated unit foam blocks of a pair of zones positioned symmetrically opposed to each other, based on a unit foam block positioned at the central portion of the mattress in the longitudinal direction of the foam mattress, have the same hardness and elasticity as each other, so that the position of the foam mattress can be inversely changed during the use of the foam mattress.

While the method of manufacturing a multi-hardness and multi-elasticity foam mattress by a continuous foaming process and the foam mattress manufactured thereby according to the present invention has been described and illustrated in connection with specific exemplary embodiments with reference to the accompanying drawings, it will be readily appreciated by those skilled in the art that it is merely illustrative of the preferred embodiments of the present invention and various modifications and changes can be made thereto within the technical spirit and scope of the present invention.

BEST MODE

In a best mode for carrying out the present invention, the present invention provides a method of manufacturing a multi-hardness and multi-elasticity foam mattress in which a plurality of unit foam blocks are formed integrally with each other by use of a continuous foaming process, the method comprising the steps of: arranging a plurality of nozzles 20 at one end of a molding plate 10; installing a separation wall 30 between two adjacent ones of the respective nozzles 20 arranged at the molding plate 10; laminating a release paper 40 on the top of the molding plate 10; spraying a foaming solution 50 from each of the nozzles 10 in such a manner as to allow the release paper 40 to move in a direction toward the other end of the molding plate 10 to correspond to the moving speed of the foaming solution 50; and molding a foam so as to integrally form a plurality of zones where a plurality of unit foam blocks 60 have multi-hardnesses and multi-elasticities different from each other.

In another best mode of the present invention, the present invention provides a multi-hardness and multi-elasticity foam mattress manufactured by the foam mattress manufacturing method, in which the plurality of unit foam blocks 60 are formed integrally with each other by a continuous foaming process.

INDUSTRIAL APPLICABILITY

The method of manufacturing a multi-hardness and multi-elasticity foam mattress by use of a continuous foaming process and the foam mattress manufactured thereby according to the present invention are expected to have a high industrial applicability since a plurality of unit foam blocks made of polyurethane foams having multi-hardnesses and multi-elasticities different from each other are formed integrally with each other along the longitudinal direction of the foam mattress by the continuous foaming process to thereby mold a foam mattress, so that the foam mattress manufacturing method is simplified to increase the productivity of the foam mattress.

The invention claimed is:

1. A method of manufacturing a multi-hardness and multi-elasticity foam mattress in which a plurality of unit foam blocks are formed integrally with each other by use of a continuous foaming process, the method comprising the steps of:
    arranging a plurality of nozzles (20) at one end of a molding plate (10);
    installing a separation wall (30) between two adjacent ones of the respective nozzles (20) arranged on the molding plate (10);
    laminating a release paper (40) on the top of the molding plate (10);
    spraying foaming solution (50) out of the nozzles (10), wherein the release paper (40) moves towards the other end of the molding plate (10) corresponding to a moving speed of the foaming solution (50); and
    molding a foam so as to integrally form a plurality of zones where a plurality of unit foam blocks (60) have a variety of hardnesses and elasticities,
    wherein the foam mattress (100) consists of the plurality of unit foam blocks (60) arranged along a longitudinal direction of the foam mattress;
    wherein at least one pair of the unit foam blocks with a same hardness and elasticity are symmetrical to each other about a central region located between a head region for supporting an upper body of a mattress user and a foot region for supporting a lower body of the user; and,
    wherein a number of the plurality of unit foam blocks (60) varies from five to nine.

2. A multi-hardness and multi-elasticity foam mattress manufactured by the method according to claim 1, in which the plurality of unit foam blocks (60) are formed integrally with each other by use of a continuous foaming process.

\* \* \* \* \*